(12) United States Patent
Anwar et al.

(10) Patent No.: US 10,569,399 B1
(45) Date of Patent: Feb. 25, 2020

(54) WIRE SLEEVE HAND APPLICATION TOOL

(71) Applicant: Brady Worldwide, Inc., Milwaukee, WI (US)

(72) Inventors: Sohail Anwar, New Berlin, WI (US); Michael Radford, Hudson, FL (US); Terrance Adams, Milwaukee, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 243 days.

(21) Appl. No.: 15/803,358

(22) Filed: Nov. 3, 2017

(51) Int. Cl.
 *B65C 3/02* (2006.01)
 *B29C 63/18* (2006.01)
 (Continued)

(52) U.S. Cl.
 CPC .............. *B25B 25/00* (2013.01); *B21F 19/00* (2013.01); *B29C 67/0014* (2013.01); *H01R 43/033* (2013.01); *B29C 63/18* (2013.01); *B29C 65/66* (2013.01); *B29C 65/7838* (2013.01); *B29C 66/301* (2013.01); *B29C 66/5221* (2013.01); *B29C 66/612* (2013.01);
 (Continued)

(58) Field of Classification Search
 CPC ... Y10T 156/18; Y10T 29/53657; B65C 3/02; B29C 63/18; B29C 65/00; B29C 65/02; B29C 65/18; B29C 65/10; B29C 65/66; B29C 65/78; B29C 65/7802; B29C 65/7838; B29C 66/00; B29C 66/301; B29C 66/5221; B29C 66/61; B29C 66/612; B29C 66/80; B29C 66/8322; B29C 66/861; B29C 66/8414; H01B 13/344

USPC .... 156/47, 51, 52, 60, 84, 85, 86, 293, 294, 156/308.2, 309.2, 349, 423, 499, 579, 156/580, 583.1; 53/399, 582, 585; 29/33 E, 33 K, 33 M, 235; 24/713.1, 24/715.4, 715.6, 715.7
See application file for complete search history.

(56) References Cited

U.S. PATENT DOCUMENTS

| | | |
|---|---|---|
| 3,675,305 A | 7/1972 | Heisler |
| 4,182,225 A | 1/1980 | Reid |
| | (Continued) | |

FOREIGN PATENT DOCUMENTS

| | | | | |
|---|---|---|---|---|
| DE | 3521139 C1 | * | 9/1986 | ........... H01B 13/344 |
| EP | 0218000 A1 | | 4/1987 | |
| | (Continued) | | | |

OTHER PUBLICATIONS

W. H. Brady Co., BPA System Operators Manual, Copyright 1985, 9 pages.

*Primary Examiner* — Philip C Tucker
*Assistant Examiner* — Brian R Slawski
(74) *Attorney, Agent, or Firm* — Quarles & Brady LLP

(57) ABSTRACT

A wire sleeve hand application tool includes a handle and a plurality of mandrels received in the handle and being selectively extendable from an axial end of the handle. Each of the mandrels are biased into a retracted position in which an entirety of the respective mandrel is received in the handle. Each of the mandrels are further axially extendable to an extended position in which an axial tip and a portion of the respective mandrel extends from the axial end of the handle while an opposite axial end of the respective mandrel remains supported within the handle. An extended mandrel may be used to insert a wire sleeve or tubular marker onto a wire or other elongate member.

16 Claims, 8 Drawing Sheets

(51) Int. Cl.
*B29C 65/66* (2006.01)
*B29C 65/78* (2006.01)
*B29C 65/00* (2006.01)
*H01B 13/34* (2006.01)
*B25B 25/00* (2006.01)
*B21F 19/00* (2006.01)
*B29C 67/00* (2017.01)
*H01R 43/033* (2006.01)
*B29K 105/00* (2006.01)
*B29L 23/00* (2006.01)

(52) U.S. Cl.
CPC ...... *B29C 66/8322* (2013.01); *B29C 66/8414* (2013.01); *B29C 66/861* (2013.01); *B29C 2795/007* (2013.01); *B29K 2105/258* (2013.01); *B29L 2023/22* (2013.01); *B65C 3/02* (2013.01); *H01B 13/344* (2013.01)

(56) References Cited

U.S. PATENT DOCUMENTS

| | | | |
|---|---|---|---|
| 4,243,466 A | 1/1981 | Lindee | |
| 4,446,616 A | 5/1984 | Waterman | |
| 4,451,965 A | 6/1984 | Carlomagno | |
| 4,574,440 A | 3/1986 | Wirth et al. | |
| 4,655,129 A | 4/1987 | Wirth et al. | |
| 4,682,411 A * | 7/1987 | Tomes, Jr. | B25B 27/20 29/235 |
| 4,865,895 A | 9/1989 | Vlamings et al. | |
| 4,868,023 A | 9/1989 | Ryan et al. | |
| 4,922,683 A | 5/1990 | Connolly | |
| 4,944,825 A | 7/1990 | Gifford et al. | |
| 5,024,042 A | 6/1991 | Meyer | |
| 5,024,049 A | 6/1991 | Strub et al. | |
| 5,060,367 A | 10/1991 | Vandevoorde | |
| 5,275,674 A | 1/1994 | Sayyadi | |
| 5,398,395 A | 3/1995 | Woolls | |
| 5,425,826 A | 6/1995 | Sayyadi et al. | |
| 5,483,783 A | 1/1996 | Lerner et al. | |
| 5,569,351 A | 10/1996 | Menta et al. | |
| 5,599,122 A * | 2/1997 | Yu | B43K 24/12 401/31 |
| 6,049,960 A * | 4/2000 | Pilling | B25B 27/28 29/235 |
| 6,923,884 B2 | 8/2005 | Eiban | |
| 7,024,841 B2 | 4/2006 | Krämer et al. | |
| 8,621,745 B2 | 1/2014 | Deonarine et al. | |
| 2002/0084020 A1 | 7/2002 | Scott et al. | |
| 2009/0056880 A1 | 3/2009 | Johnson | |
| 2009/0154983 A1* | 6/2009 | Khoshnevis | B41J 3/36 401/34 |
| 2011/0144624 A1* | 6/2011 | Glaister | A61M 25/00 604/524 |
| 2013/0061443 A1 | 3/2013 | Fengler et al. | |
| 2013/0269834 A1 | 10/2013 | Haschke | |
| 2015/0284126 A1 | 10/2015 | Schanke et al. | |

FOREIGN PATENT DOCUMENTS

| | | | | |
|---|---|---|---|---|
| EP | 0581385 A1 | | 2/1994 | |
| GB | 984042 A | * | 2/1965 | ........... H01B 13/344 |
| GB | 1039124 A | * | 8/1966 | ........... H01B 13/344 |
| GB | 1399870 A | * | 7/1975 | ........... H01B 13/344 |
| GB | 2197292 A | * | 5/1988 | ............... B65C 3/02 |
| GB | 2405849 A | | 3/2005 | |

* cited by examiner

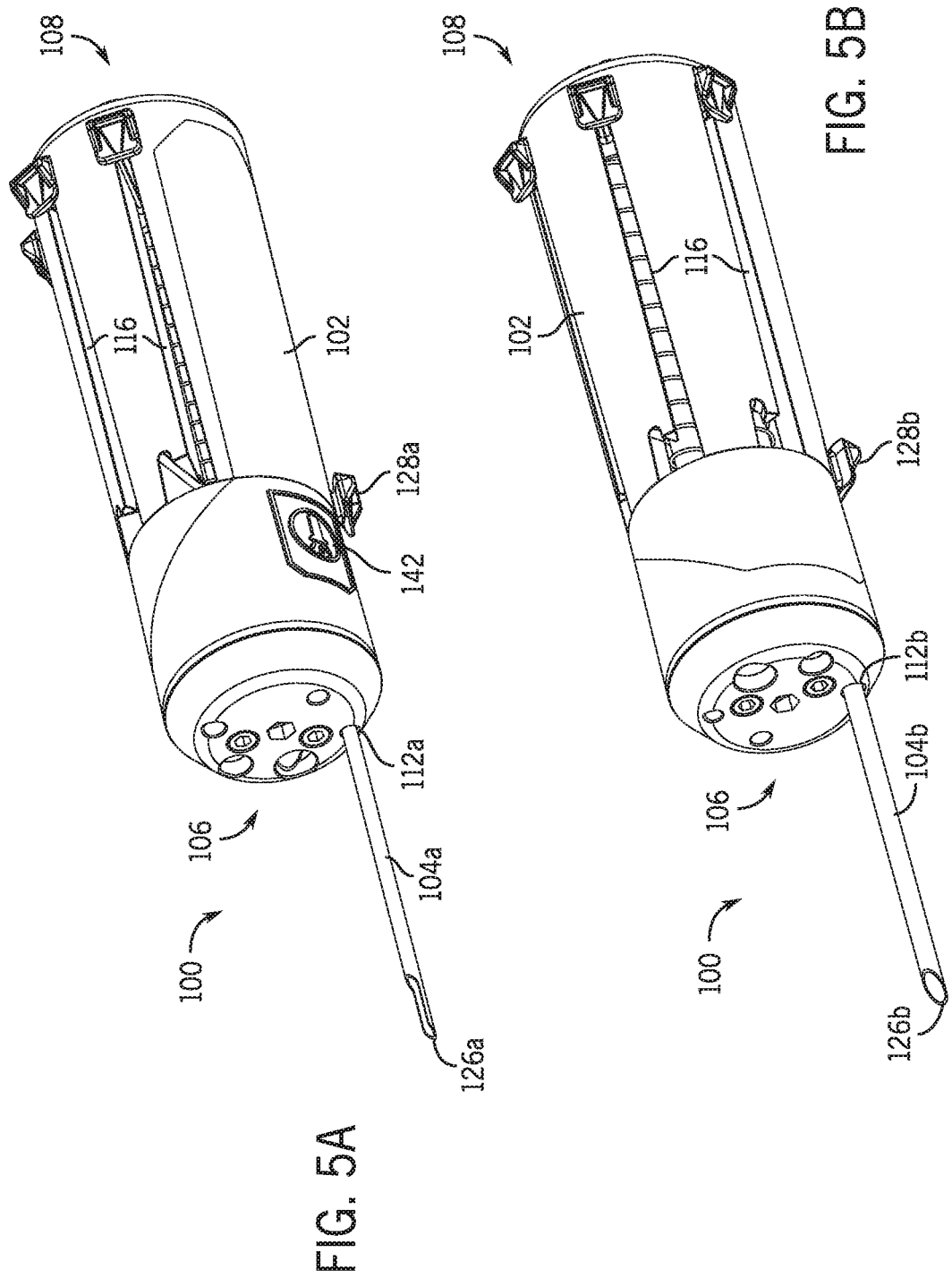

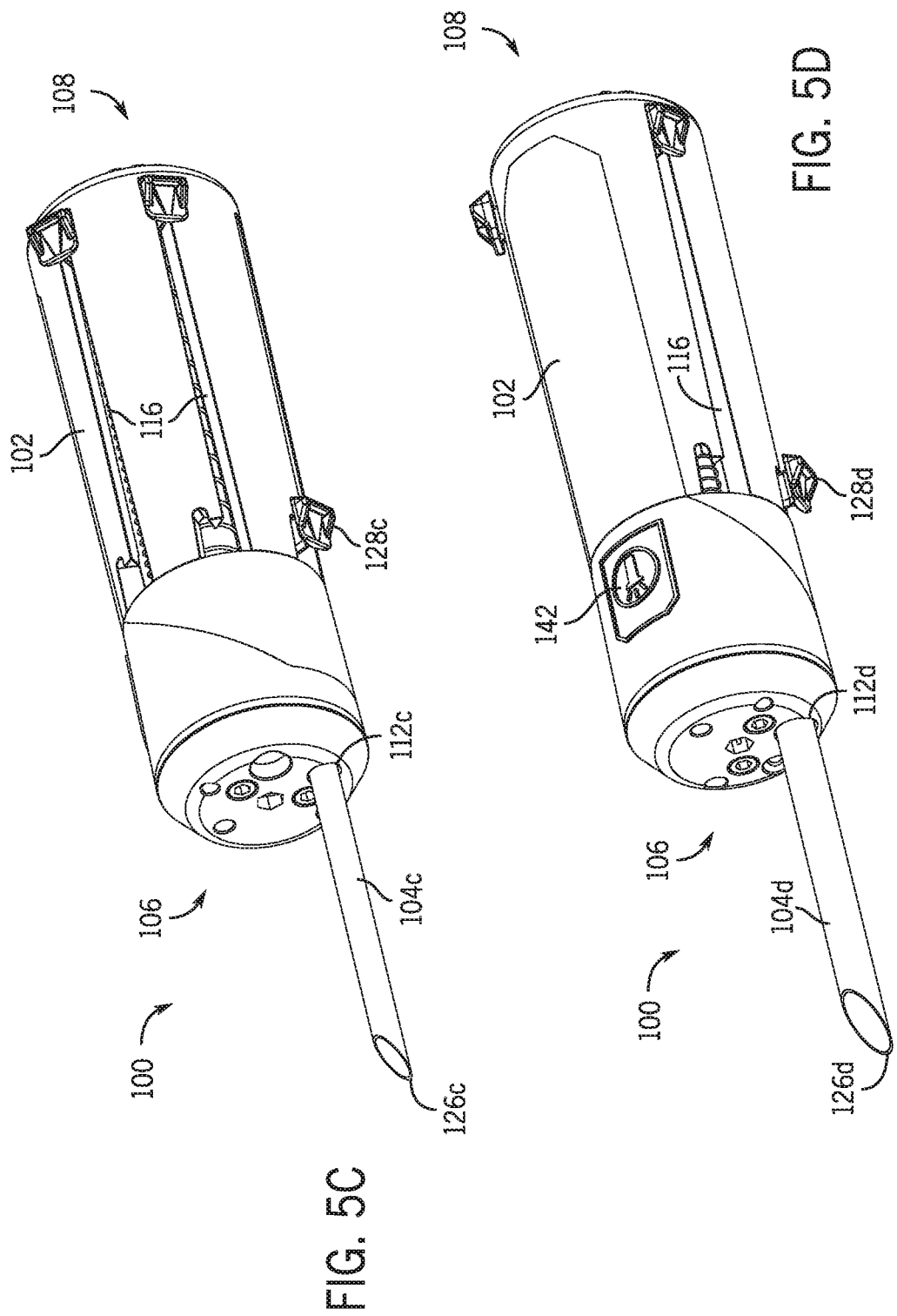

WIRE SLEEVE HAND APPLICATION TOOL

CROSS-REFERENCE TO RELATED APPLICATIONS

Not applicable.

FIELD OF INVENTION

This disclosure relates to tools and devices for the placement of wire sleeves or other tubular markers over wires or other elongated objects.

BACKGROUND

Tubular sleeve markers are often used to mark elongated objects such as wires so that the wires can be distinguished from one another. Most commonly, such markers are employed when many wires are being used or the wires are run over long distances as, in both situations, it may be difficult to establish the different ends of a single wire.

In some instances, the tubular sleeve markers are prepared and presented in a flat configuration in which the tube form is pressed together to be flattened with creased axially-extending edges. The sleeves may be provided in flat form and often on a strip of paper for a number of reasons including to make the sleeves more compact for shipping, to better permit the attachment of multiple sleeves into a single strip, and to accommodate printing on the sleeve. When the sleeve has been folded to be flat, in order to apply the sleeve around the wire, the sleeve is pinched to open the central opening of the sleeve for insertion of the wire and lifted from the strip.

Accordingly, the manual application of tubular sleeve markers (whether folded or not) to wires is often a time-consuming and frustrating practice given the relatively small size of many sleeves and the dexterity required to apply the sleeve to the wire.

SUMMARY

Disclosed herein is a tool for manually placing wire sleeves or other tubular sleeve markers over a wire or other elongated object. Rather than manipulating the sleeves by hand with fingers and attempting to thread the sleeve onto the wire, the tool can be used to pick up the sleeve and effortlessly thread the sleeve over the wire. The tool may be operated by hand and include multiple diameters of mandrels received in and extendable from a handle to accommodate different sizes of wires or sleeves.

According to one aspect, a wire sleeve hand application tool is disclosed. The wire sleeve hand application tool includes a handle having a central axis and a plurality of mandrels received in the handle. The mandrels are selectively extendable from an axial end of the handle. Each of the mandrels are biased into a retracted position in which an entirety of the respective mandrel is received in the handle. The mandrels are, however, axially extendable to an extended position in which an axial tip and a portion of the respective mandrel extends from the axial end of the handle while an opposite axial end of the respective mandrel remains supported within the handle.

When extended, a mandrel may be used to pick up a wire sleeve or tubular marker on its outer cylindrical surface and a wire or other elongate object may be received in a hollow channel in the mandrel. The sleeve or marker may then be slid over the wire or other elongate object in order to apply the sleeve or marker thereto. In this way, the individual applying the sleeve does not need to use his or her fingers to attempt to slide the sleeve unto the wire.

In some forms, the handle may include a plurality of slots, each corresponding to a mandrel in which each respective slot has an axially-extending section and an angularly-extending section with the angularly-extending section being on an end of the axially-extending section proximate the axial end of the handle from which the respective mandrel extends. The wire sleeve hand application tool may further include a plurality of arms in which each respective arm is associated with a respective mandrel and in which an axial displacement of the arm is used to selectively extend the respective mandrel from the axial end of the handle. Each respective arm may be received in a respective corresponding slot.

In some forms, the arms may radially extend through and beyond the outer surface of the handle and include a contact surface (for example, a thumb pad) for actuation of the respective arm (for example, in an axial direction) and the respective corresponding mandrel.

Each respective slot may further include an axially-extending locking section that extends axially away from the angularly-extending section with both the axially-extending section and the axially-extending locking section extending away from the angularly-extending section in a direction away from the axial end from which the respective mandrel is extendable and wherein the arm is receivable in the axially-extending locking section to maintain the respective mandrel in the extended position against any biasing force.

In some forms, each of the mandrels is a tube having a hollow central opening. The axial tip of at least some of the mandrels may be oblique relative to an axis of the respective mandrel in order to help accommodate the reception of the wire. In some instances, the tip may be oblique and planar; however it is contemplated that other geometric forms may also be used to help nest the wire into the opening.

It is further contemplated that each of the mandrels may have a different outer diameter than a remainder of the mandrels.

In some forms, the tool may further include additional tools. For instance, the handle may support a flashlight or a separate non-mandrel tool which is selectively extendable from the handle (for example, a screw driver, hex wrench, or so forth).

In some forms, the tool may include a plurality of biasing mechanisms which each respectively urge a corresponding one of each of the plurality of mandrels towards the retracted position. The biasing mechanisms may be springs such as compression springs, but other biasing mechanisms may also be used.

In some forms, the handle may further support a plurality of axially-extending guides. Each mandrel and its corresponding guide may have a respective shared axis. Still further, each mandrel may be limited in movement by the corresponding guide to a translational direction along the shared axis and a rotational direction about the shared axis.

In some forms, each of the plurality of mandrels may have a respective axis that is parallel to and offset from one another. Thus, while the mandrels may be extendable from the handle, each may extend through a separate opening.

According to another aspect, a method is disclosed of installing a wire sleeve over a wire using the wire sleeve hand application tool described herein. One of the plurality of mandrels is extended from the handle. The wire sleeve is placed over an outer surface of the extended mandrel. The wire is placed in a hollow central opening of the extended mandrel. The wire sleeve is then positioned over the wire placed in the mandrel and the wire is withdrawn from the mandrel with the wire sleeve now received thereon.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DESCRIPTION OF THE DRAWINGS

FIG. 5A-5D are views with respective ones of the mandrels extended from the handle with the other mandrels still in the handle.

DETAILED DESCRIPTION

Figure 1:
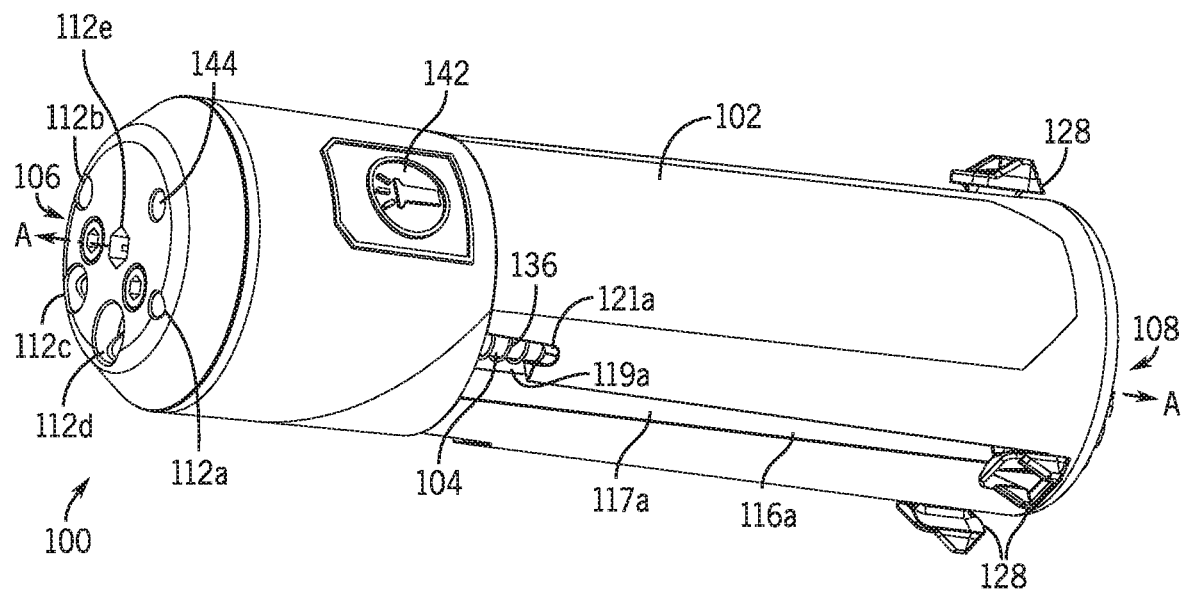
FIG. 1 is a front-side perspective view of a wire sleeve hand application tool in accordance with one aspect of this disclosure in which an axial end from which mandrels extend from the handle is visible.
Figure 2:
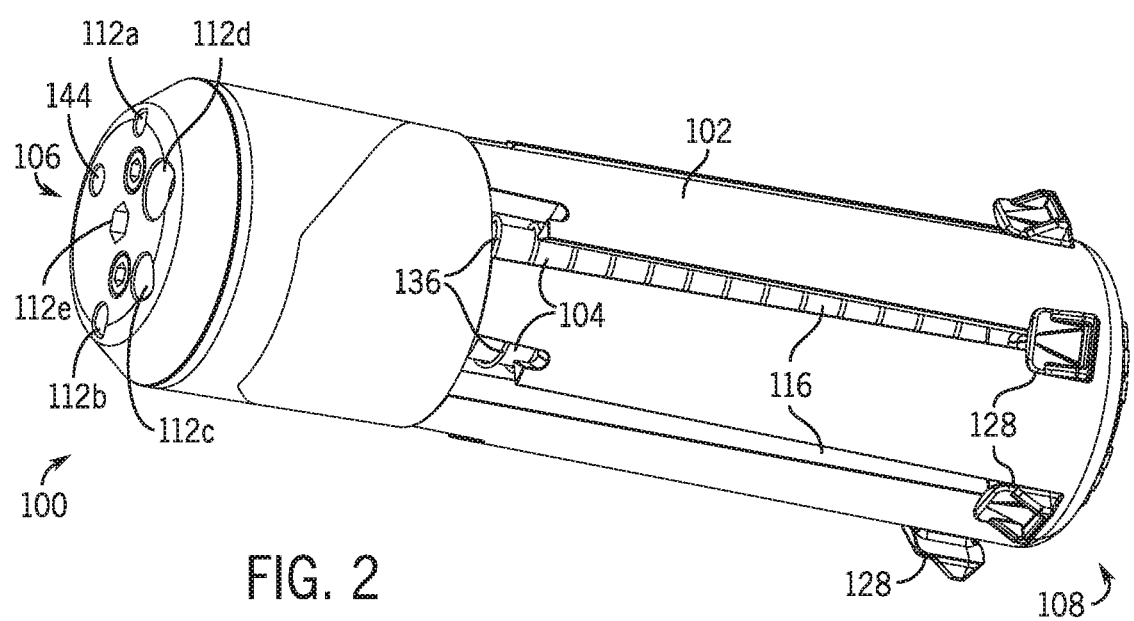
FIG. 2 is another front-side perspective view of the tool of FIG. 1 in which another side of the tool is illustrated.
Figure 3:
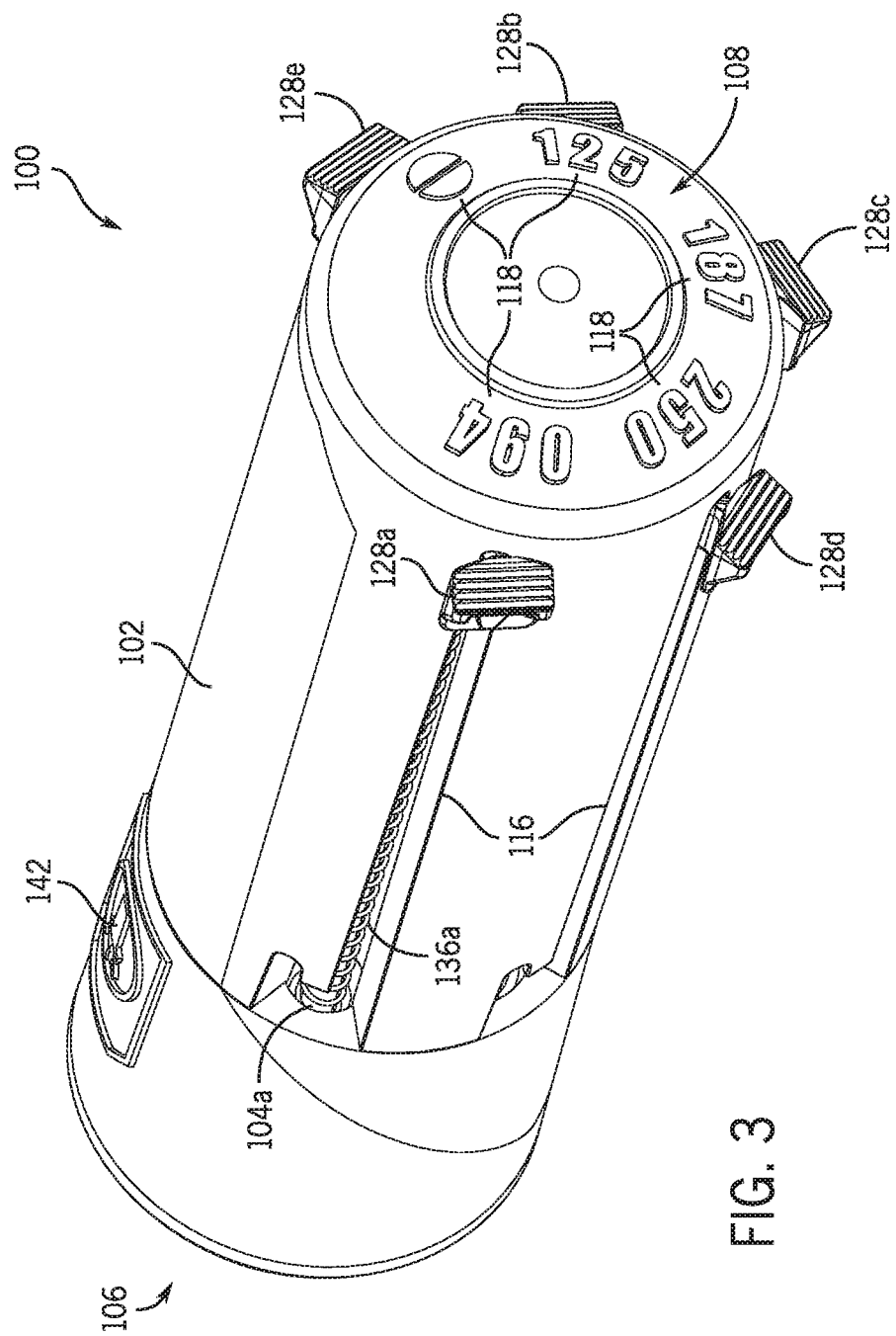
FIG. 3 is rear-side perspective view of the tool of FIG. 1 in which the opposing axial end of the tool can be seen.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Referring to FIGS. 1-3, 4A-4B, and 5A-5E, a wire sleeve hand application tool 100 (which may be referred to simply as "the tool" below) is illustrated. In the most general sense, this tool 100 includes a handle 102 with a plurality of differently-sized mandrels 104 that are separately extendable from the handle 102. With one of the mandrels 104 extended, a user can place a wire sleeve or other tubular marker over the outer cylindrical surface of the mandrel, place a wire or other elongate object in a hollow opening or channel in the center of the mandrel, and then slide the sleeve or marker over the wire or object. In this way, the tool 100 provides an improved way for manual application of a sleeve or label to a wire or other elongate object.

Turning now to the specific structure of the tool 100, the handle 102 is generally cylindrical body oriented along an axis A-A (labeled only in FIG. 1) extending between two axial ends 106 and 108. As can be seen from FIGS. 4A-4B and 5A-5E, the handle 102 houses the plurality of mandrel 104 (including individual mandrels 104a, 104b, 104c, and 104d) and a separate non-mandrel tool in the form of a screwdriver 110, all of which are selectively extendable from the handle 102 through respective openings 112 (including openings 112a-d for the mandrels 104a-d and 112e for the screwdriver 112e) at the axial end 106 against internally-contained biasing mechanisms.

Please note that throughout the remainder of the specification and figures, sub-number letters a-e will be used to identify like members with each subset (e.g., "a") used to draw correspondence between that item and other similarly lettered items. Further the number without the sub-number letter will be used to generically identify the members. So, for example, mandrels 104 includes mandrels 104a, 104b, 104c, and 104. Still yet, openings 112 (including openings 112a, 112b, 112c, and 112d) will have a correspondence to the mandrels 104 (e.g., mandrel 104a corresponds to opening 112a). As noted above, the sub-number letter "e" will refer to features associated with or corresponding to the screwdriver 110.

Figure 4A:
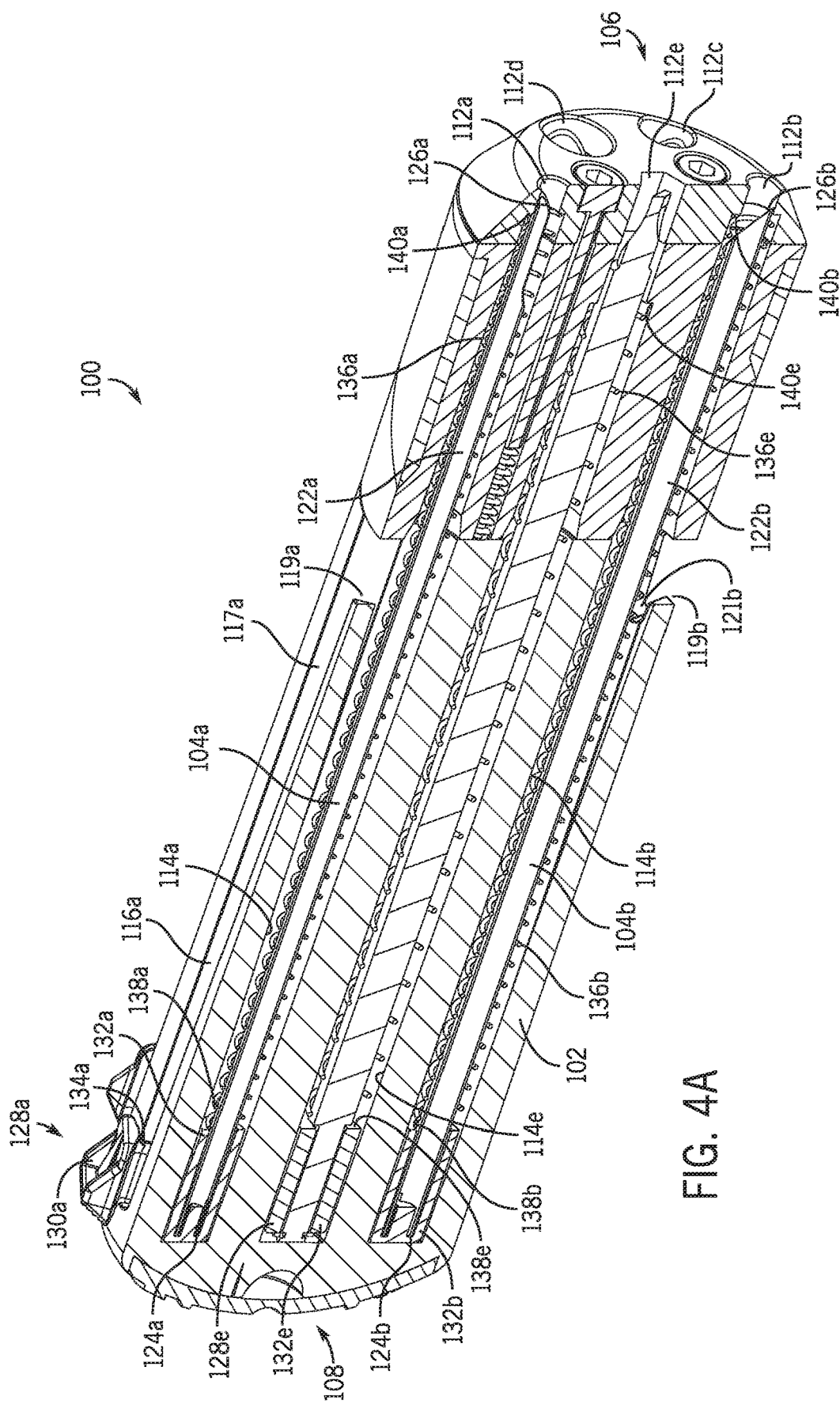
FIG. 4A is a cross-sectional side view of the tool illustrating two of the mandrels and the screwdriver in a retracted position.
Figure 4B:
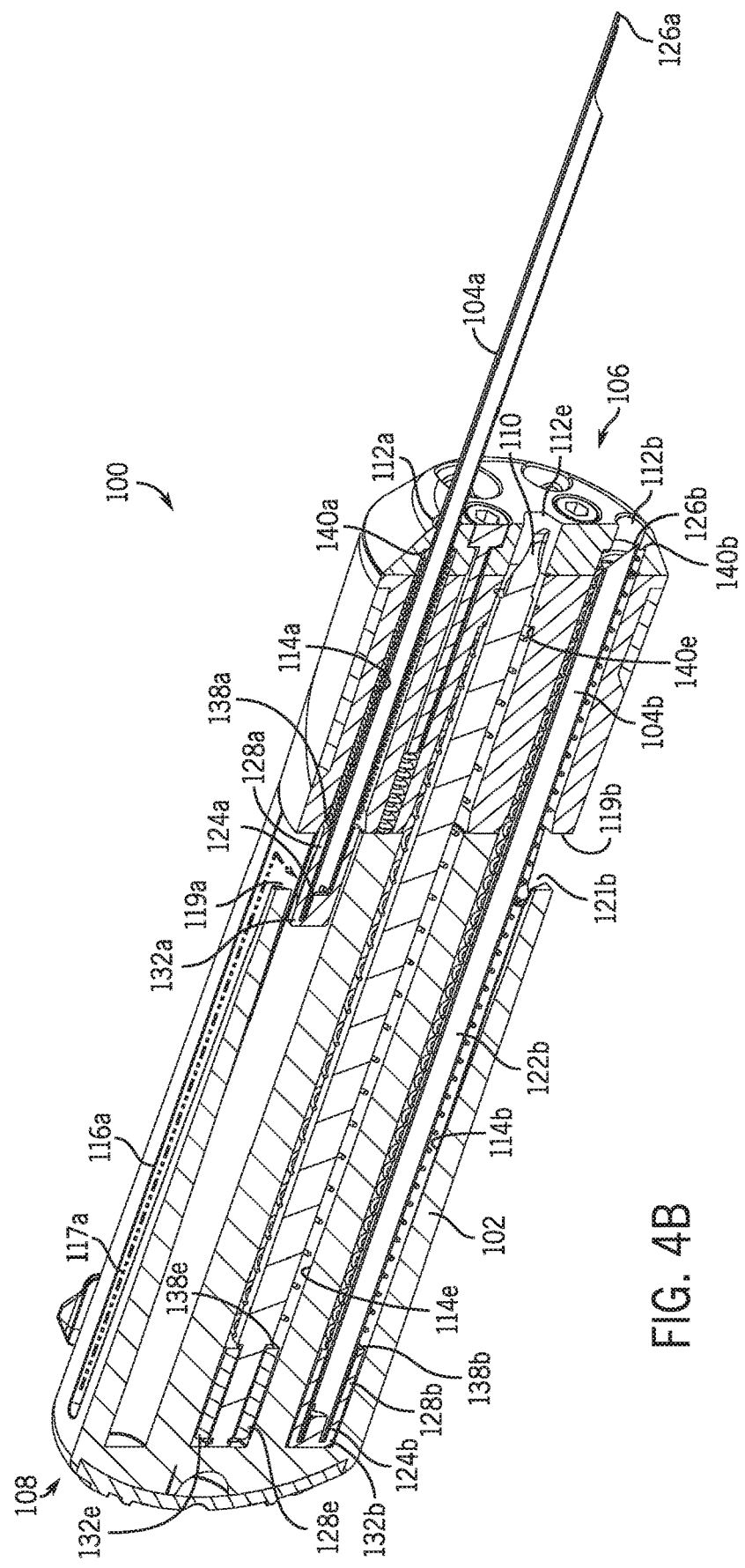
FIG. 4B is a cross sectional side view similar to FIG. 4A, but in which one of the mandrels has been moved to the extended position so that the tool may be used.
Figure 5E:
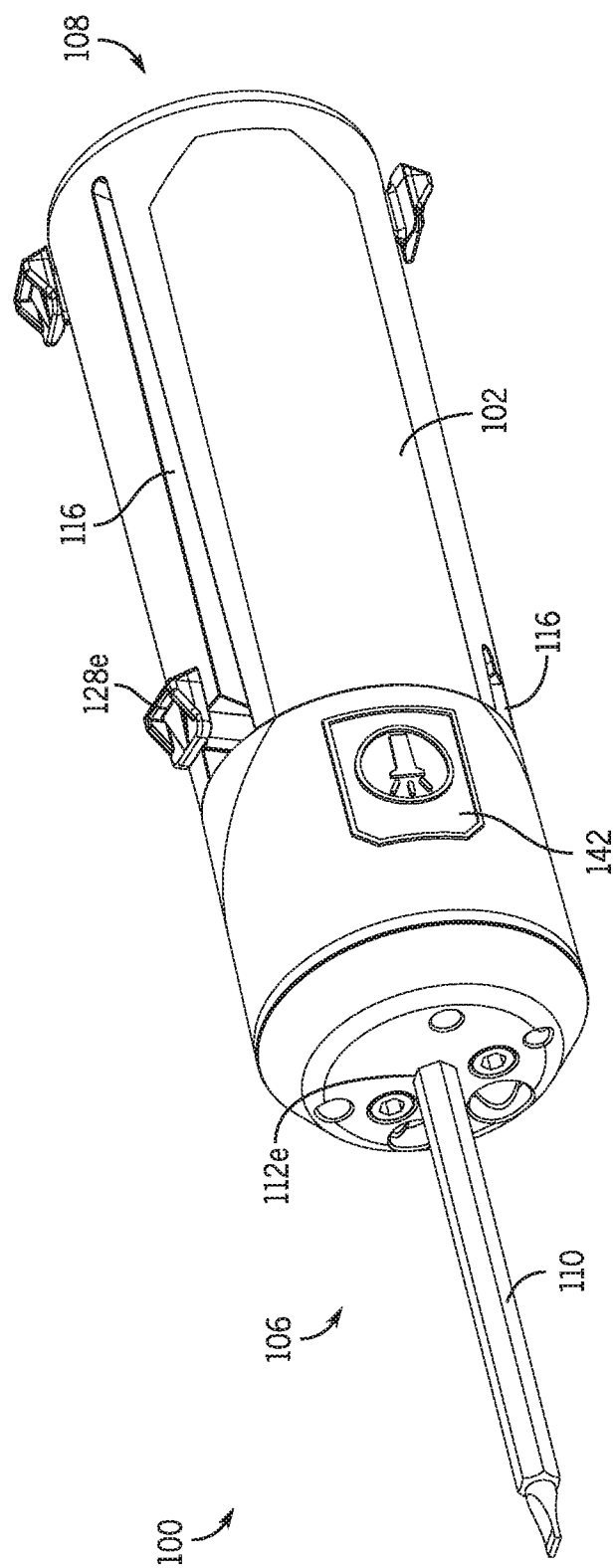
FIG. 5E is a view of a non-mandrel tool extended from the handle (in this case, a screwdriver).

As can be best seen in FIGS. 4A and 4B, the handle 102 internally includes guides 114 for the mandrels 104 and screwdriver 110. In the form, illustrated, the guides 114 (again denoted 114a-114e, with sub-number letter correspondence to respective other features) are simply internal channels that axially through the body of the handle and to the openings 112 at the axial end 106. Each of those guides 114 correspond directly to one of the mandrels 104 or the screwdriver 110. In the illustrated form, each of the guides 114 or channels are parallel to the axis A-A and extend out of openings 112 on the axial end 106. However, it should be appreciated that the guides may have other geometric shapes or orientations and further that some of the openings could potentially be positioned on the other axial end 108 of the handle 102 if design considerations dictated that it would be desirable to have mandrels 104 or other tool heads extendable from both axial ends.

On the outside surface of the handle 102, there are slots 116 associated with each of the internally-positioned guides 114 which each correspond with a respective one of the mandrels 104 or screwdriver 110. Each of these slots 116 has an axially-extending section 117 that is comparably long, an angularly-extending section 119, and an axially-extending locking section 121 that is comparably short to axially-extending 117. See FIG. 1A for a clear depiction of these three segments with respect to identification of slot 116a. These sections form a U-shape for the slot 116 with the angularly-extending section 119 being on an end of the axially-extending section 117 proximate the axial end 106 of the handle 102 from which the respective mandrel 104 extends and with the axially-extending section 117 and the axially-extending locking section 121 extending away from the angularly-extending section 119 in direction away from the axial end 106 having the openings 112 from which the corresponding mandrel 104 or screwdriver 110 is extendable. It is noted that each of these slots 116 is in communication with a corresponding one of the internal guides 114 to enable the actuation of the mandrels 104 or screwdriver 110 via a corresponding pusher arm 128 as will be described below.

With respect to the outside of the handle 102, there are a few other features of the handle body that help improve usability. First, with reference to FIG. 3, there may be indicia 118 on the handle 102 (in this case on the axial end 108) which provide indications of the different diameters of the mandrels 104 or the tool type associated (e.g., flat head screwdriver icon) with each pusher arm or axial column. Second, it should be appreciated that because the tool 100 is a manual hand tool, it may be the case that some or all of the exterior of the handle 102 may be formed to be ergonomic. For example, a plastic or elastomeric overmolding may cover sections of the handle 102 where the user will grip the handle 102 to improve comfort and ergonomics in manipulation of the tool 100.

With the basic structure of the handle 102 itself having been described, the structural relationship between the handle 102 and the extendable elements (i.e., the mandrels 104 and the screwdriver 110 in this particular embodiment), their corresponding biasing mechanisms, and the corresponding pusher arms 128 will now be described.

With particular reference being made to FIGS. 4A-4B and 5A-5D, the various mandrels 104 are elongate hollow straight tubular members having a corresponding hollow central channel 122 and extending from a base end 124 to an axial tip 126 that is extendable out of the axial end 106 the handle 102. With respect to the axial tips 126, best shown in FIGS. 5A-5D, the axial tips 126 are preferably formed at an oblique angle relative to the axis of the respective mandrel 104 in order to better accommodate the reception or placement of a wire or elongate object in the corresponding channel 122. As illustrated in FIG. 5A, for mandrels of small diameter, such as mandrel 104a, the tip 126a may be scoop-shaped such that one semicircular region is removed from the end to provide increased area for insertion of the small-gauge wire or elongate object. As illustrated in FIGS. 5B-5D, for larger diameter mandrels, such as mandrels 104b-104d, the respective tips 126b-126d may simply be planar at an oblique angle relative to the axis of extension of the mandrel. In addition to providing additional area to receive the wire or elongate object in the channel 122, the point of the tip 126 may be beneficial in that it can help to wedge open folded sleeves or markers as they are threaded onto the mandrel 104.

Figure 6:
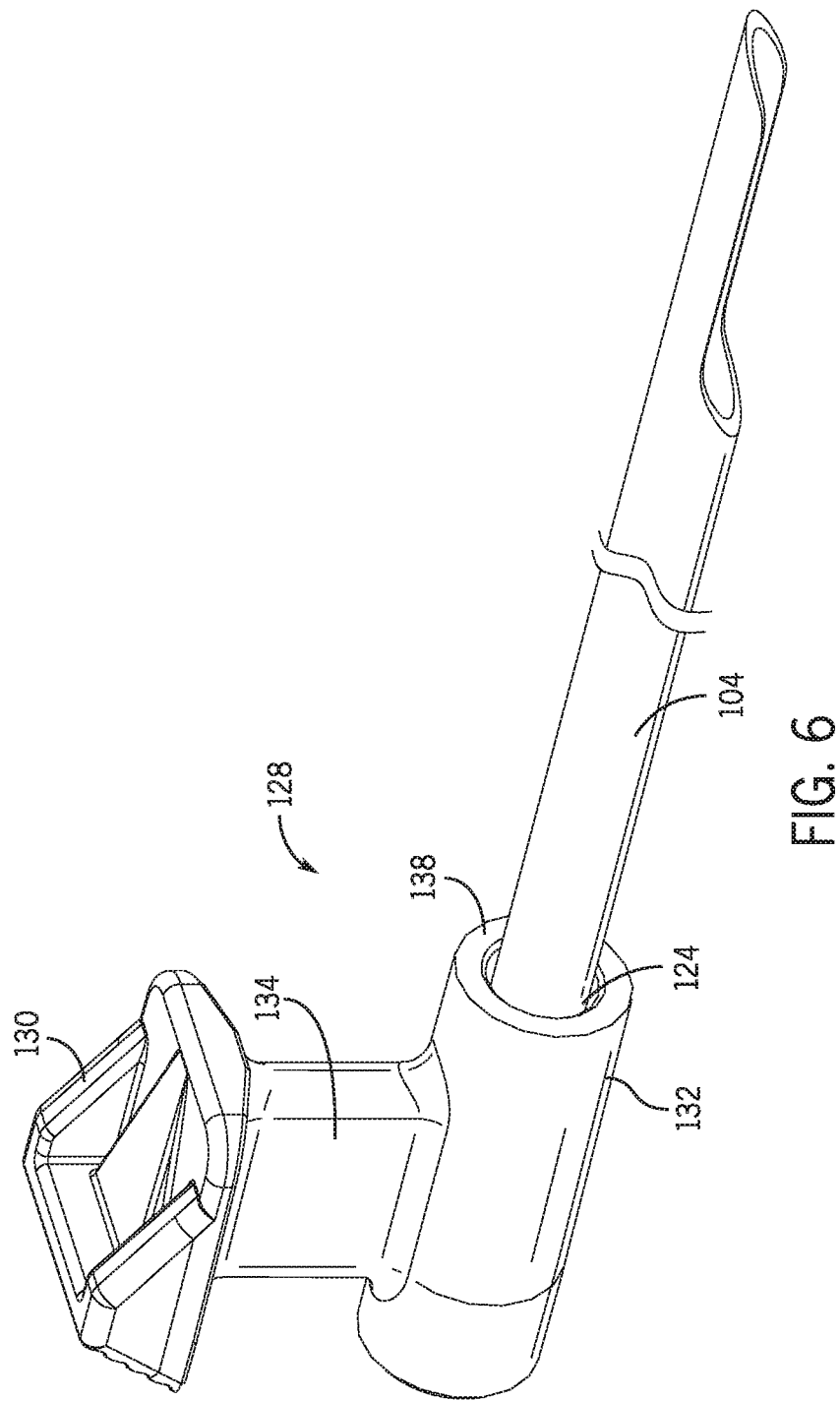
FIG. 6 is a perspective view of a pusher arm having both a portion for user contact and a mandrel seat portion (which mandrel is illustrated, in part, and as being in that seat portion).

Referring now to FIG. 6, the base end 124 of a mandrel 104 is illustrated as received in a pusher arm 128. The pusher arm 128 includes a portion for user contact 130 and a mandrel seat portion 132 which are connected by a radially-extending arm 134. Generally speaking, the base end of the mandrel 104 is received in the mandrel seat portion 132 of the pusher arm 128 and fixed thereto. In the greater assembly of the tool 100 and as can be seen from FIGS. 4A and 4B, both the mandrel 104 and the mandrel seat portion 132 are received in the corresponding guide 114 such that they are distally positioned relative to the corresponding opening 112 when the mandrel 104 is fully retracted into the handle 102 (with the axial tip 126 of the mandrel 104 being closer to the corresponding opening 112). As can be seen from the external views in FIG. 1-3, radially-extending arms 134 extend through corresponding slots 116 of the handle 102 such that the portions for user contact 130 are located radially outward of the body of the handle 102 for actuation by the user (for example, by a thumb).

With reference being made to FIGS. 4A and 4B, the biasing mechanisms can be best seen the help urge the respective mandrels towards the retracted position. In the form illustrated, the biasing mechanisms are compression springs 136 which are interposed between facing surfaces or steps including an axial surface 138 on the mandrel seat portion of the pusher arm 128 and an axial surface 140 on an opposing end of the guide 114 (which may be part of an axial or cover) proximate the openings 114 in the axial end 106. That spring 136 biases, urges, or otherwise encourages the axial linear translation of the mandrel 104 into the retracted position.

It is noted that the screwdriver 110 has corresponding features to each of the mandrels 104 as can be seen in part in FIGS. 4A and 4B. While it will not be expressed in great detail, these corresponding features (numbered with sub-number letter "e") can work and be structured in effectively the same way as each of the mandrels 104.

Turning now to the general operation of the tool 100, each of the respective mandrels 104 (or screwdriver 110) is selectively actuatable or extendable between a retracted position illustrated in FIGS. 1-3 and 4A and an extended position illustrated in FIGS. 4B and 5A-E. With the arm 134 angularly aligned with the axially-extending section 117 of the slot 116 (as is best depicted in FIG. 4A), the spring 136 biases the mandrel 104 into the body to the retracted position. However, if a user pushes the pusher arm 128 toward the axial end 106 against the biasing force of the spring 136 (effectively overcoming the biasing force and in the instant case, compressing the spring 136), the mandrel 104 is translated axially through the opening 112 such that the axial tip 126 and a portion of the mandrel 104 extends outward through and beyond the opening 112. Once the pusher arm 128 is moved up to the location at which the pusher arm 128 has been advanced to where the axially-extending section 117 meets the angularly-extending section 119, the pusher arm 128 can be rotated about the axis of the respective mandrel 104 until the pusher arm 128 angularly aligns with the axially-extending locking section 121. At this point, when the user releases the pusher arm 128, the pusher arm 128 moves in the direction of retraction in the axially-extending locking section 121. However, because the axially-extending locking section 121 is significantly shorter than the axially-extending section 117, when the pusher arm 128 (and attached mandrel) is biased back by the biasing mechanism, the arm 134 of the pusher arm 128 contacts the portion of the axially-extending locking section 121 closest to the axial end 108 which serves as a stop preventing further axial displacement of the mandrel 104, leaving a portion of the mandrel 104 and the axial tip 126 extended out from the opening 126 in an extended position (shown in FIGS. 5A-5D for each respective mandrel).

In this extended position, the tool 100 may be used as described above to apply a sleeve or marker to a wire or elongate member. Further, because the radially-extending arm 134 is biased into the axially-extending locking section 121 of the slot 116, the mandrel 104 is effectively locking in place and the pusher arm 128 is not angularly rotatable back to a position in which the mandrel 104/pusher arm 128 is retractable until the biasing mechanism is overcome.

In order to retract the mandrel 104, the opposite set of motions is performed by the user to again overcome the biasing force. Effectively, the pusher arm 128 is advanced against the biasing force towards the axial end 106 along the axially-extending locking portion 121 until it reaches the angularly-extending extending portion 119. At the angularly-extending extending portion 119, the pusher arm 128 is angularly rotated until the radially-extending arm 134 aligns with the axially-extending portion 117. In this angular orientation, the pusher arm 128 can be released and urged via the biasing mechanism back towards the axial end 108 until the radially-extending arm 134 contacts the end of the axially-extending portion 117 closest to axial end 108 which is effectively the stop against the biasing force. When the pusher arm 128 and mandrel 104 have axially translated back into this position, they have returned to the retracted position.

In a similar manner to the mandrels, the screwdriver 110 can be extended or retracted using pusher arm 128e. Likewise any other tool could be extended or retracted from the body of the handle 102 with a similar guide and biasing mechanism. However, because the screwdriver 110 and the opening 112e have hexagonal-shaped stems and openings (and are therefore the stem of the screwdriver 110 is not rotatable about its central axis in the opening 112e), it may be the case that the pusher arm 128e bears on the end of the stem of the screwdriver 110 closest to the axial end 108. Put another way, the pusher arm 128e is fixed in axial position with respect to the end of the stem of the screwdriver 110, but is also rotatable around it. This can be achieved, for example by creating a cylindrical-shaped bearing surface on each of the two parts, mating them together, and then placing a locking ring on the axial end of the stem to prevent the axial withdrawal of the end of the stem from the central opening of the pusher arm.

It should be noted that there are effectively two separated rings of engagement in which surfaces bear against one another which can help to stabilize the axial alignment of the mandrel 104 in either the retracted or extended position. The first ring of engagement is between the radially-outward facing surface of the mandrel seat section 132 (to which the mandrel 104 is fixed) and radially-inward facing surface of the guide 114. The second ring of engagement is between the radially-outward facing surface of the mandrel 104 and the radially-inward facing surface of the opening 112. Regardless of the position of the mandrel 104 relative to the handle 102, these rings of engagement will be maintained, which maintain the axial alignment, which still accommodating angular rotation of the pusher arm 128 to effectuate locking and unlocking in the extended position.

Finally, it will be noted that other tools or features which are not extendable/retractable can be present on the tool 100 as well. In the particular tool 100 illustrated, there is a push button 142 on the cylindrical surface of the handle 102 that may be depressed to turn on or off an LED bulb 144 so that the tool can also serve as a flashlight. Other type of tools or features might also be included.

While an exemplary tool has been illustrated, variations to the tool are certainly contemplated. As one example the form of guidance could vary from that illustrated tool. For example, the mandrel may, in part, ride along an axial post received in its opening in the handle to guide the mandrel. Still yet, things like the shape, size, and geometric arrangement of the mandrels or other tools might be varied. Thus, while the illustrated tool is exemplary, it should not be taken in any way to be limiting.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A wire sleeve hand application tool comprising:
a handle having a central axis;
a plurality of mandrels received in the handle and being selectively extendable from an axial end of the handle, each of the plurality of mandrels being a tube having a hollow central opening extending to a respective axial tip of a respective mandrel, and each of the plurality of mandrels being biased into a retracted position in which an entirety of the respective mandrel is received in the handle and being axially extendable to an extended position in which the respective axial tip and a portion of the respective mandrel extends from the axial end of the handle while an opposite axial end of the respective mandrel remains supported within the handle.

2. The wire sleeve hand application tool of claim 1, wherein the handle includes a plurality of slots each corresponding to the plurality of mandrels in which each respective slot has an axially-extending section and an angularly-extending section with the angularly-extending section being on an end of the axially-extending section proximate the axial end of the handle from which the respective mandrel extends, wherein the wire sleeve hand application tool further includes a plurality of arms in which each respective arm is associated with a corresponding mandrel and in which an axial displacement of the arm is used to selectively extend the corresponding mandrel from the axial end of the handle, and wherein each respective arm is received in a respective corresponding slot.

3. The wire sleeve hand application tool of claim 2, wherein the plurality of arms are radially-extending through and beyond an outer surface of the handle and include a contact surface for actuation of the respective arm and the corresponding mandrel.

4. The wire sleeve hand application tool of claim 3, wherein, each respective slot further has an axially-extending locking section that extends axially away from the angularly-extending section with both the axially-extending section and the axially-extending locking section extending away from the angularly-extending section in a direction away from the axial end from which the respective mandrel is extendable and wherein the arm is receivable in the axially-extending locking section to maintain the respective mandrel in the extended position against any biasing force.

5. The wire sleeve hand application tool of claim 1, wherein the axial tip of at least some of the plurality of mandrels is oblique relative to an axis of the respective mandrel.

6. The wire sleeve hand application tool of claim 1, wherein each of the plurality of mandrels has a different outer diameter than a remainder of the plurality of mandrels.

7. The wire sleeve hand application tool of claim 1, wherein the axial tip is planar and oblique to an axis of the respective mandrel.

8. The wire sleeve hand application tool of claim 1, further comprising a separate non-mandrel tool which is selectively extendable from the handle.

9. The wire sleeve hand application tool of claim 8, wherein the separate non-mandrel tool is a screw driver.

10. The wire sleeve hand application tool of claim 1, further comprising a plurality of biasing mechanisms which each respectively urge a corresponding one of each of the plurality of mandrels towards the retracted position.

11. The wire sleeve hand application tool of claim 10, wherein the plurality of biasing mechanisms are springs.

12. The wire sleeve hand application tool of claim 1, wherein the handle further supports a plurality of axially-extending guides.

13. The wire sleeve hand application tool of claim 12, wherein each mandrel and a corresponding one of the plurality of axially-extending guides have a respective shared axis.

14. The wire sleeve hand application tool of claim 13, wherein each mandrel is limited in movement by the corresponding guide to a translational direction along the shared axis and a rotational direction about the shared axis.

15. The wire sleeve hand application tool of claim 1, wherein the each of the plurality of mandrels have a respective axis that is parallel to and offset from one another.

16. A method of installing a wire sleeve over a wire using the wire sleeve hand application tool of claim 1, the method comprising:

extending one of the plurality of mandrels from the handle;

placing the wire sleeve over an outer surface of the mandrel which is extended;

placing the wire in the hollow central opening of the mandrel which is extended;

positioning the wire sleeve over the wire placed in the mandrel; and withdrawing the wire from the mandrel with the wire sleeve now received on the wire.

* * * * *